United States Patent [19]

Creek et al.

[11] Patent Number: 5,034,036

[45] Date of Patent: Jul. 23, 1991

[54] DEVICE FOR SEPARATING WATER FROM ENGINE INTAKE AIR

[75] Inventors: Duane M. Creek, Leo; Richard A. Prine, Fort Wayne, both of Ind.

[73] Assignee: Navistar International Transportation Corp., Chicago, Ill.

[21] Appl. No.: 612,035

[22] Filed: Nov. 13, 1990

[51] Int. Cl.[5] .......... B01D 47/00

[52] U.S. Cl. .......... 55/201; 55/385.3; 55/465; 180/64.3

[58] Field of Search .......... 55/183-188, 55/190, 199, 201, 385.3, 434, 465, 319, 355, 315; 180/68.3

[56] References Cited

U.S. PATENT DOCUMENTS

| | | | |
|---|---|---|---|
| 3,923,480 | 12/1975 | Visch | 55/465 X |
| 3,934,992 | 1/1976 | Thompson | 55/385.3 X |
| 3,987,862 | 10/1976 | Lidstone | 55/385.3 X |
| 4,212,659 | 7/1980 | Magrini | 55/385.3 |
| 4,366,878 | 1/1983 | Warf | 55/385.3 X |
| 4,699,639 | 10/1987 | Gieseke et al. | 55/385.3 |

*Primary Examiner*—Charles Hart
*Attorney, Agent, or Firm*—Dennis K. Sullivan

[57] ABSTRACT

A water separation device designed to be free-standing, self-contained and easily mounted to a housing of an air cleaner in an air intake system of an internal combustion engine includes a housing having an air inlet opening, an air outlet opening having an internal bellmouth section which feeds an air intake port of the air cleaner, and defines a circuitous air flow path, including a 180° turn therein, which causes multiple directional changes to air flowing therethrough, with water particles in the air being thrown off during the directional changes by centrifugal force.

17 Claims, 2 Drawing Sheets

DEVICE FOR SEPARATING WATER FROM ENGINE INTAKE AIR

BACKGROUND OF THE INVENTION

The present invention relates to a device for separating water from intake air being provided to an internal combustion engine via an air cleaner of an engine air intake system. More particularly, the device is self contained, is free standing, and is configured to form two chambers which create multiple changes in direction in the air flow path therethrough, with water in the air being thrown off by centrifugal force as the air maneuvers therethrough and drained out of the chambers to supply dry air to the air cleaner.

THE PRIOR ART

Heretofore, it is known to provide water separation systems incorporated into hood mounted duct work supplying intake air to an internal combustion engine. For example, U.S. Pat. Applications Ser. No. 07/374,496, filed June 30, 1989, and Ser. No. 07,468,405, filed February 16, 1990, teach such systems. However, many vehicles cannot be equipped with such systems. For example, when the vehicle chassis and engine are manufactured by one source and the body structure is manufactured by another source, the source for the engine and chassis components has no access to the body components to incorporate such system into the vehicle hood.

It is also known to provide water separating devices and drains within air cleaners to remove moisture from the air.

SUMMARY OF THE INVENTION

It is a primary object of the present invention to provide a free standing, self-contained water separation system which may be mounted to the air cleaner immediately upstream thereof to provide dry air to the air cleaner.

According to the invention, there is provided a device for separating water from air being supplied to an air cleaner in an air intake system of an internal combustion engine, the device comprising an elongate, essentially rectangular upright housing forming an upper chamber divided by a vertical wall extending from the chamber bottom adjacent an air intake opening to an upper end defining, with a semicylindrical upper chamber wall, an opening providing a U-turn for the air stream. The device further includes a lower chamber communicating with the upper chamber and including an air outlet opening. Structure is provided for attaching the lower chamber to a housing of the air cleaner in a manner to align the air outlet opening of the device with an air intake port of the air cleaner housing.

The device is thus configured to create a plurality of abrupt directional changes, including a 180° turn in a vertical plane, in the air stream through the device to create a centrifugal force upon water particles within air flowing through the device to cause the particles to be thrown out of the air stream onto the chamber walls, with the water particles exiting the chambers through drain ports provided therein. The upward flow of the air stream from the air inlet opening reduces the possibility of reentrainment of previously separated water particles which are moving to the bottom of the upper chamber by gravity.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
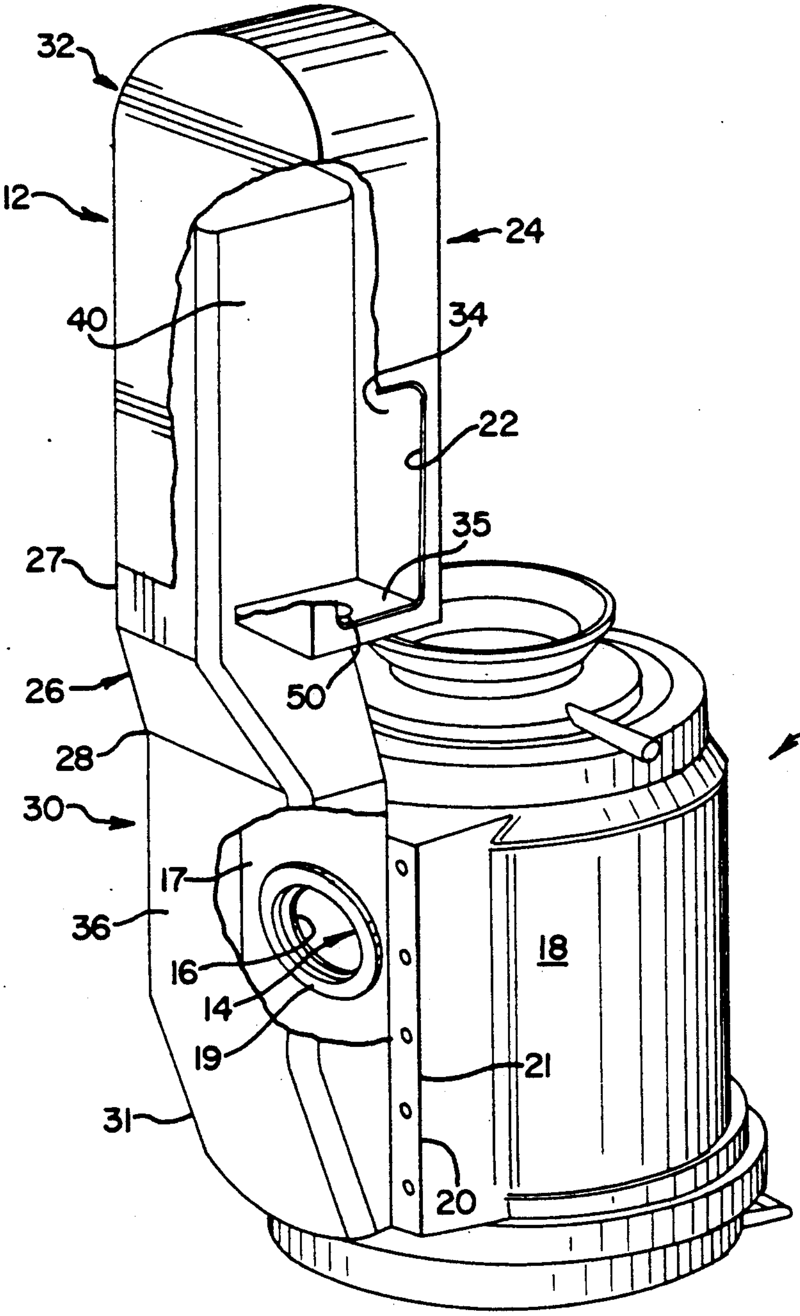
FIG. 1 is a perspective view, partly broken away, of an air cleaner for a vehicle engine having the water separation device of the present invention mounted thereto.

Referring now to the drawings in greater detail, there is illustrated in FIG. 1 a contemporary air cleaner 10 of the type used with an internal combustion engine (not shown) for eliminating potentially harmful contaminants from intake air being supplied to the engine combustion chambers. Such air cleaner 10 typically suffers from water intake, which, as it enters the filter medium inherently decreases efficiency of the system by wetting the filter medium, decreasing airflow therethrough. Further, because the air cleaner 10 is not designed to eradicate water particles from the air, such water particles may find their way through the filter medium and into the engine. To eliminate entry of water into the filter, the water separation device 12 of the present invention is secured over an air cleaner inlet 14 for providing substantially water-free intake air to the medium (not shown) of the air cleaner 10.

Figure 3:
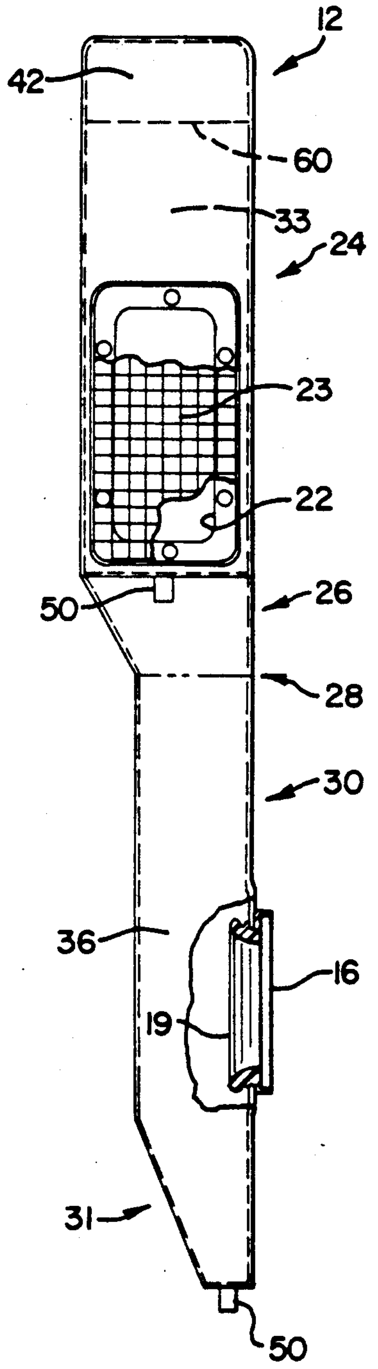
FIG. 3 is a side view partly in section of the device.

In this respect, the device 12 includes an outlet opening 16 in a lower rear wall 17 thereof which is configured and arranged to engage the air cleaner inlet opening 14 when the device 12 is mounted to a housing 18 of the air cleaner 10, as shown, by a mounting flange 20 provided for this purpose. Preferably, as best shown in FIG. 3, an annular rubber bellmouth nozzle or venturi ring 19 is disposed in the outlet opening 16, the nozzle or venturi section of the ring 19 diverging into the device, to improve flow efficiency by reducing pressure losses across the outlet. The mounting flange 20 includes a plurality of holes 21 which may receive mounting means (not shown) such as screws therethrough for fixing said device 12 to said air cleaner housing 18 in appropriate manner.

An air inlet opening 22 is provided for the water separation device 12 which lies in a plane rotated 90° from that of the outlet opening 16 and which, when the air cleaner 10 and device 12 are mounted within a vehicle, lies at an angle of approximately 90° to the path of travel of the vehicle to minimize the entry of road splash and rain thereinto. To ensure that only a minimal amount of solid large particles may enter the device 12, the inlet opening 22 is preferably covered by a screen 23 (FIG. 3).

Externally, the water separation device 10 is configured in two pieces: an upper rectangular entrance member 24 having a semicylindrical upper wall 32 and incorporating the air inlet opening 22, and a lower member 26 which includes a vertically opening tube 27 of rectangular cross-section which slidingly fits within the upper rectangular entrance member 24 and is sealed thereto, a wedge-shaped transition section which narrows in the fore-and-aft plane while it broadens in the transverse plane as it approaches its lower margin 28 and a lower section 30 which is a flattened rectangle compared to the upper rectangular section 24 and includes a lower portion 31 which tapers to the rear wall 17 beneath the outlet opening 16. The housing 18 is thus configured in a manner to allow clearance for chassis components therearound.

Inasmuch as the device 12 will inherently encounter water and other corrosive elements contained in, for example, road splash, it is proposed to form both members 24 and 26 of the device 12 entirely from a plastic material, such as polypropylene, which will also yield a lightweight component compared to a metal material.

Figure 2:
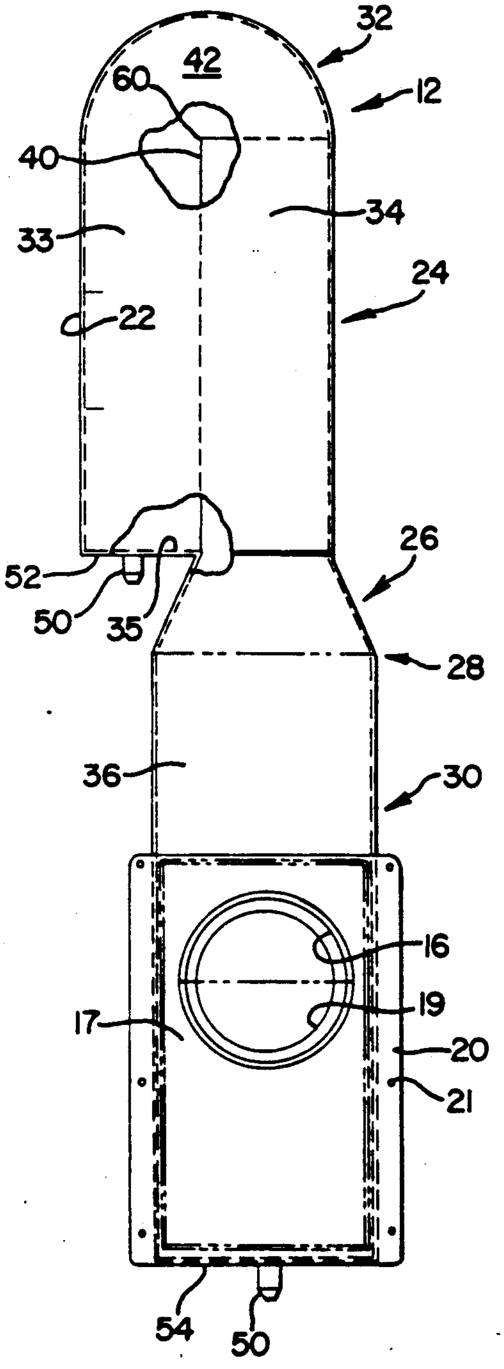
FIG. 2 is an elevation view partly in section of the device taken along a plane perpendicular to the interface between the device outlet and the air cleaner inlet.

Turning now to FIG. 2 and the internal configuration of the device 12 which creates a circuitous airflow path therein, it will be seen that the upper rectangular member 24 defines a first chamber 33 therein and the lower member 26 defines an adjacent chamber 34 the chambers being divided by a partitioning wall 40 therebetween, the wall of tube 27, disposed parallel to the plane in which the air inlet opening 22 lies and extending from the base 35 of the chamber 34 adjacent the inlet 22 to a distal end 60 spaced from the upper wall 32 to create, with the upper wall 32, an inverted U-shaped passageway 42 between the chambers 33 and 34.

Thus, as air enters the inlet opening 22 in the chamber 33, travelling generally horizontally thereinto, it immediately encounters the partitioning wall 40 and is turned 90° upwardly. The air is thus shunted into passageway 42 of the chamber 33, flows therealong and is redirected 180° to a downward path of travel, into the chamber 34 formed by tube 27. The air continues on this downward path, through the transition section 26 and into a chamber 36 defined within lower section 30. Once in the lower chamber 36, the air, in order to exit via the outlet opening 16 into the air cleaner 10, once again takes a 90° turn, travelling horizontally again, into and through bellmouth nozzle 19 in the outlet opening 16 and into the air cleaner 10.

Figure 4:
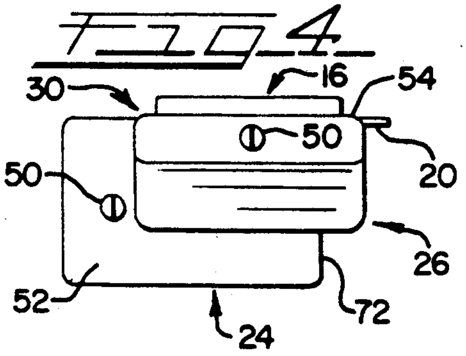
FIG. 4 is a bottom view of the device showing drain valves therein.

The air is thus maneuvered through multiple turns, with water particles therein being thrown out of the air stream onto the walls of the device 12 around each such turn by centrifugal force as the water particles are thrown off from the air onto the interior surface of the chambers 33 and 34, they seek the lowest level in each chamber 33, 36 and from such level exit the chambers 33 and 36 through drain ports comprising elastomeric cylindrical evacuator valves 50 (FIG. 4), one provided in a bottom surface 52 of the upper section 24 and one provided in a bottom surface 54 of the lower section 30. The drain valves 50, commonly used in air cleaner applications, allow water to be expelled from the system while prevention ingestion of untreated air and contaminants therethrough.

Thus, the device of the present invention provides a self-contained, free standing water separation system which can be mounted directly to any air cleaner which has an intake port sized and configured in a manner to accommodate an engagement thereof with the outlet opening of the device. It will be appreciated by those of skill in the art that modifications variations may be made without departing from the teachings of the present invention. Accordingly, the scope of the invention is only to be limited as necessitated by the accompanying claims.

What is claimed is:

1. A device for separating water from air being supplied to an air cleaner of an air intake system for an internal combustion engine, said device comprising: an elongate, essentially rectangular upright housing defining fluidly communicating upper and lower sections therein, said upper section including an air intake opening and being divided into two adjacent vertical chambers by a central wall disposed therebetween parallel to the plane of the air inlet opening and extending upwardly into said upper section from a bottom surface thereof to an upper end defining a passage between said vertical chambers, said lower section including an air outlet opening; mounting means on said device adapted for engagement of said lower section to a housing of an air cleaner; said device being arranged and configured to create a circuitous air flow path therethrough including a plurality of directional changes within the air flow path through said device.

2. The device of claim 1 wherein said air intake opening is covered by a screen.

3. The device of claim 1 wherein said upper section includes an upper wall which is semicylindrical and connects said two vertical chambers to each other to form an inverted U-shaped configuration.

4. The device of claim 3 wherein said lower section is narrower than said upper section when viewed in a direction facing said air inlet opening.

5. The device of claim 1 wherein an annular ring forming a bellmouth nozzle diverging inwardly into said device is disposed about the periphery of said air outlet opening.

6. The device of claim 1 wherein said air outlet opening lies in a plane rotated 90° from the plane of said air inlet opening.

7. The device of claim 6 wherein said lower section includes a bottom portion which tapers downwardly in an area below the outlet opening.

8. The device of claim 3 including a tapering, wedge-shaped transition portion which connects said upper section to said lower section.

9. The device of claim 8 wherein air enters said intake opening in a horizontal direction, abuts said central wall and turns 90° upwardly, travels through said inverted U-shaped upper section and exits therefrom in a downward direction, passing through said transition portion of said device, into said lower section where it again turns 90° to horizontally exit said air outlet opening therein.

10. The device of claim 1 wherein a drain is provided in a bottom wall of said upper section housing.

11. The device of claim 10 wherein a drain is provided in a bottom wall of said lower section housing.

12. The device of claim 1 wherein said mounting means comprise a peripheral flange on said lower section housing by means of which said device is mounted to the air cleaner housing.

13. The device of claim 1 wherein said lower section terminates upwardly in a vertically opening tube and a portion of said upper section slidably engages said vertically opening tube in a manner establishing sealed fluid communication between said upper and lower sections.

14. In combination with an air cleaner, a device for separating water from air being supplied to an internal combustion engine, said device comprising:

an elongate, essentially rectangular, upright, two-piece housing having fluidly connected upper and lower sections therein, said upper section including an air intake opening and being divided into two vertical chambers by a centrally disposed wall lying in a plane parallel to the plane of the air inlet opening and extending upwardly into said section from a bottom surface thereof to an upper end defining a passage between said vertical chambers, said lower section including an air outlet opening;

mounting means engaging said lower section to a housing of said air cleaner in a manner to align said air outlet opening of said device with an air intake port of the air cleaner housing;

said chambers of said device being arranged and configured to create a circuitous air flow path therethrough including a plurality of directional changes within the air flow path through said device.

15. The device of claim 14 wherein an annular ring forming a bellmouth nozzle diverging inwardly into said device is disposed about the periphery of said air outlet opening.

16. The device of claim 14 wherein said lower section includes a portion of one of said vertical chambers, said centrally disposed wall being a part of said lower section.

17. The device of claim 14 wherein said lower section includes an upwardly opening tube of rectangular cross section, said tube being closely fit within said upper section and having a wall defining said centrally disposed wall between said chambers.

* * * * *